United States Patent
Makihara et al.

(10) Patent No.: US 8,028,367 B2
(45) Date of Patent: Oct. 4, 2011

(54) VEHICLE WIPER APPARATUS

(75) Inventors: Hiroaki Makihara, Anjo (JP);
Masayuki Tajima, Toyota (JP); Hitoshi Hoshino, Toyota (JP); Tohru Akita, Okazaki (JP); Toshiharu Kamiya, Kariya (JP)

(73) Assignees: Mitsubishi Jidosha Engineering Kabushiki Kaisha, Okazaki-shi (JP);
Mitsubishi Jidosha Kogyo Kabushiki Kaisha, Tokyo (JP)

( * ) Notice: Subject to any disclaimer, the term of this patent is extended or adjusted under 35 U.S.C. 154(b) by 929 days.

(21) Appl. No.: 11/452,235

(22) Filed: Jun. 14, 2006

(65) Prior Publication Data

US 2006/0282971 A1 Dec. 21, 2006

(30) Foreign Application Priority Data

Jun. 15, 2005 (JP) ................... 2005-174691

(51) Int. Cl.
*B60S 1/32* (2006.01)
*B60S 1/34* (2006.01)
*B60S 1/48* (2006.01)

(52) U.S. Cl. .................. 15/250.04; 15/250.23

(58) Field of Classification Search ............. 15/250.02, 15/250.23, 250.29, 250.351; 137/625.44; 239/284.1

See application file for complete search history.

(56) References Cited

U.S. PATENT DOCUMENTS

| 3,336,619 | A | * | 8/1967 | Hoyler | 15/250.14 |
| 3,793,670 | A | * | 2/1974 | Riester et al. | 15/250.04 |
| 5,203,049 | A | * | 4/1993 | Nogawa | 15/250.02 |
| 5,363,531 | A | | 11/1994 | Chevrier et al. | |
| 5,987,695 | A | | 11/1999 | Edele et al. | |
| 6,094,772 | A | * | 8/2000 | West | 15/250.04 |
| 6,286,174 | B1 | * | 9/2001 | Zimmer | 15/250.04 |

FOREIGN PATENT DOCUMENTS

| GB | 2326083 | | * | 12/1998 |
| GB | 2326083 | A | * | 12/1998 |
| JP | 54-170541 | U | | 12/1979 |
| JP | 04078752 | A | * | 3/1992 |
| JP | 404078752 | A | * | 3/1992 |
| JP | 4-124568 | U | | 11/1992 |
| JP | 10-6933 | A | | 1/1998 |
| JP | 2000-177539 | A | | 6/2000 |
| JP | 2003-48517 | A | | 2/2003 |

* cited by examiner

*Primary Examiner* — Monica Carter
*Assistant Examiner* — Stephanie Newton
(74) *Attorney, Agent, or Firm* — Birch, Stewart, Kolasch & Birch, LLP

(57) ABSTRACT

A vehicle wiper apparatus for wiping a windshield glass with a wiper blade includes drive means for reciprocating the wiper blade in an arcuate wiping area, and a first washer fluid spray means, provided on the drive means, for spraying a washer fluid. The first washer fluid spray means sprays the washer fluid onto a area in an upward wiping direction of the wiper blade when the wiper blade is located near its stop position, and sprays the washer fluid onto a area in a downward wiping direction of the wiper blade when the wiper blade is located near its inversion position.

6 Claims, 4 Drawing Sheets

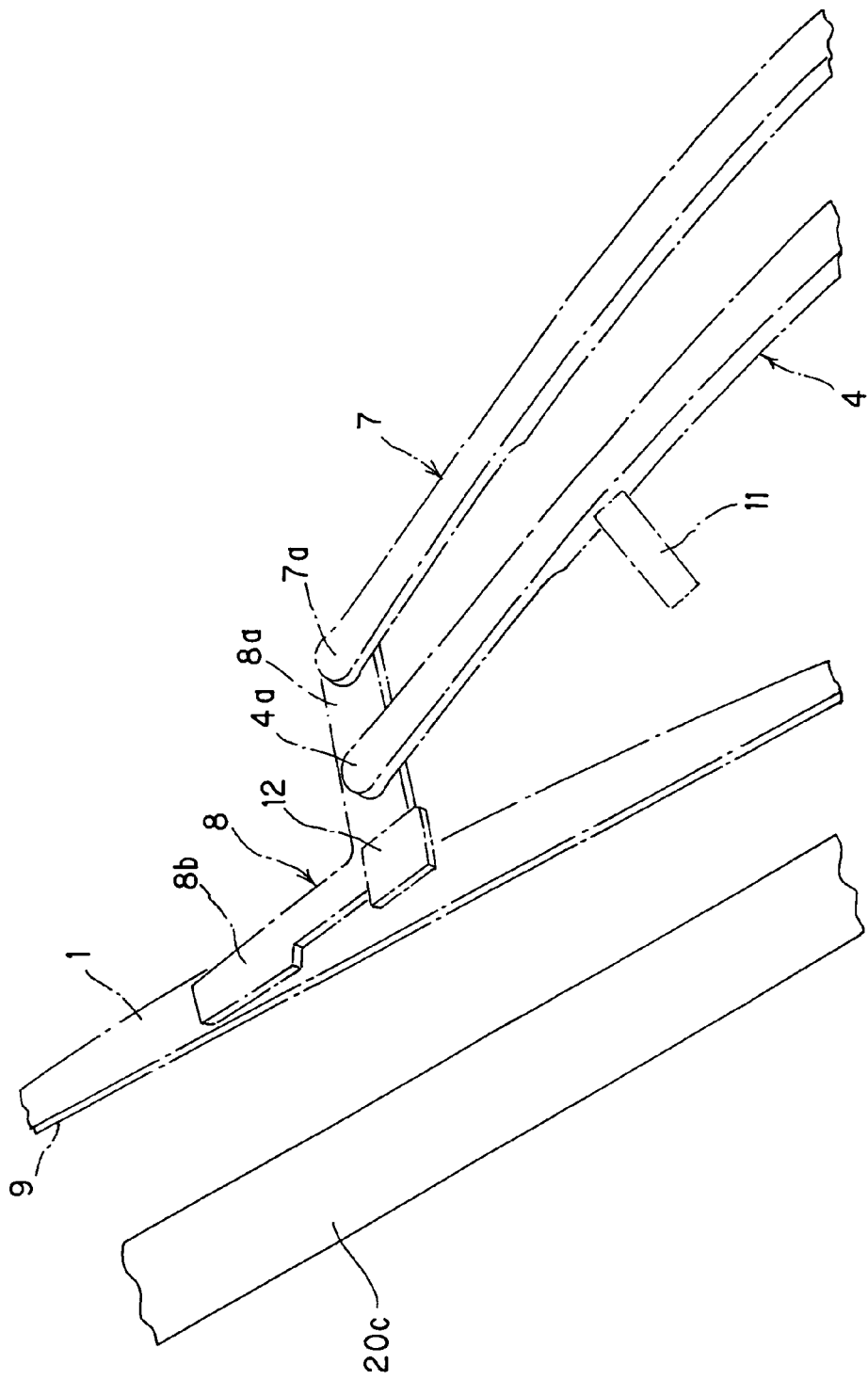

VEHICLE WIPER APPARATUS

BACKGROUND OF THE INVENTION

1. Field of the Invention

This invention relates to a vehicle wiper apparatus.

2. Description of the Related Art

A vehicle wiper apparatus is mounted in the vicinity of a windshield glass of a vehicle. A wiper blade of the vehicle wiper apparatus is reciprocated in an arcuate wiping area so that a blade rubber attached to the wiper blade wipes off deposits, such as rainwater or snowflakes, adhering to the surface of the windshield glass. Moreover, the surface of the windshield glass is sprayed with a washer fluid to allow the smooth motion of the blade rubber and improve the wiping of the deposits.

Examples of a spray nozzle for spraying the washer fluid include that fixed to a wiper arm, that fixed to a stay for connecting the wiper blade and the wiper arm (see, for example, Japanese Patent Application Laid-Open No. 2000-177539), and that fixed to an engine hood of a vehicle (see, for example, Japanese Patent Application Laid-Open No. 1998-6933).

The vehicle wiper apparatus having the spray nozzle fixed to the wiper arm, however, faces the following problem: If the spray nozzle is set to spray the washer fluid in the upward wiping direction of the wiper blade, it follows that during downward wiping with the wiper blade, the washer fluid is sprayed rearwardly in the downward wiping direction of the wiper arm. As a result, the washer fluid keeps remaining on the surface of the windshield glass until the wiper arm wipes upward, thereby deteriorating a vehicle driver's field of vision. Furthermore, if the washer fluid is sprayed when the wiper arm is located in proximity to the position of its inversion (i.e., the position of a change in the direction of its movement), the washer fluid is sprayed onto a area where the blade rubber does not wipe. Thus, the problem arises that a surplus of the washer fluid is used.

With the vehicle wiper apparatus described in Japanese Patent Application Laid-Open No. 2000-177539, the washer fluid is sprayed from the spray nozzle, whereby the wiper blade is allowed to move smoothly and easily wipe off deposits on the surface of the windshield glass. However, when the washer fluid is sprayed from the spray nozzle during the downward wiping action of the wiper arm, the washer fluid is sprayed rearwardly in the downward wiping direction of the wiper arm. This washer fluid remains on the surface of the windshield glass until the wiper arm wipes upward, thereby deteriorating the vehicle driver's field of vision. Furthermore, if the washer fluid is sprayed when the wiper arm is located in proximity to the position of its inversion, the washer fluid is sprayed onto the area where the wiper arm does not wipe. This poses the problem that a surplus of the washer fluid is used.

With the vehicle wiper apparatus for the windshield glass described in Japanese Patent Application Laid-Open No. 1998-6933, the position of spraying and the timing of spraying of the washer fluid can be controlled according to the position of the wiper arm. However, the spray nozzle has to be provided on the engine hood, and mechanisms for controlling the spray position and the spray timing for the washer fluid are provided within the washer nozzle, thus posing the problem that the apparatus per se is complicated.

The present invention has been proposed in light of the above-described problems. It is an object of the invention to provide a vehicle wiper apparatus which has a simple structure, and which can spray the washer fluid onto an optimal area regardless of the position of the wiper blade.

SUMMARY OF THE INVENTION

An aspect of the present invention is a vehicle wiper apparatus arranged to wipe a windshield glass with a wiper blade, and including drive means for reciprocating the wiper blade in an arcuate wiping area on the windshield glass, and a first washer fluid spray means, provided on the drive means, for spraying a washer fluid, wherein the drive means is composed of a drive wiper arm having a base end mounted on a driving pivot, an auxiliary wiper arm having a base end mounted on an auxiliary pivot disposed in a vicinity of the driving pivot, and a stay pivotally supported by other end of the drive wiper arm and other end of the auxiliary wiper arm and supporting the wiper blade, and the first washer fluid spray means is disposed to spray the washer fluid onto a area in an upward wiping direction of the wiper blade when the wiper blade is located in a vicinity of a stop position, and to spray the washer fluid onto a area in a downward wiping direction of the wiper blade when the wiper blade is located in a vicinity of an inversion position.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an enlarged view of a portion encircled by a line IV in FIG. 2.

DETAILED DESCRIPTION OF THE INVENTION

The best mode for putting the vehicle wiper apparatus according to the present invention into practice will be described concretely based on an embodiment with reference to the accompanying drawings.

Embodiment

Figure 1:
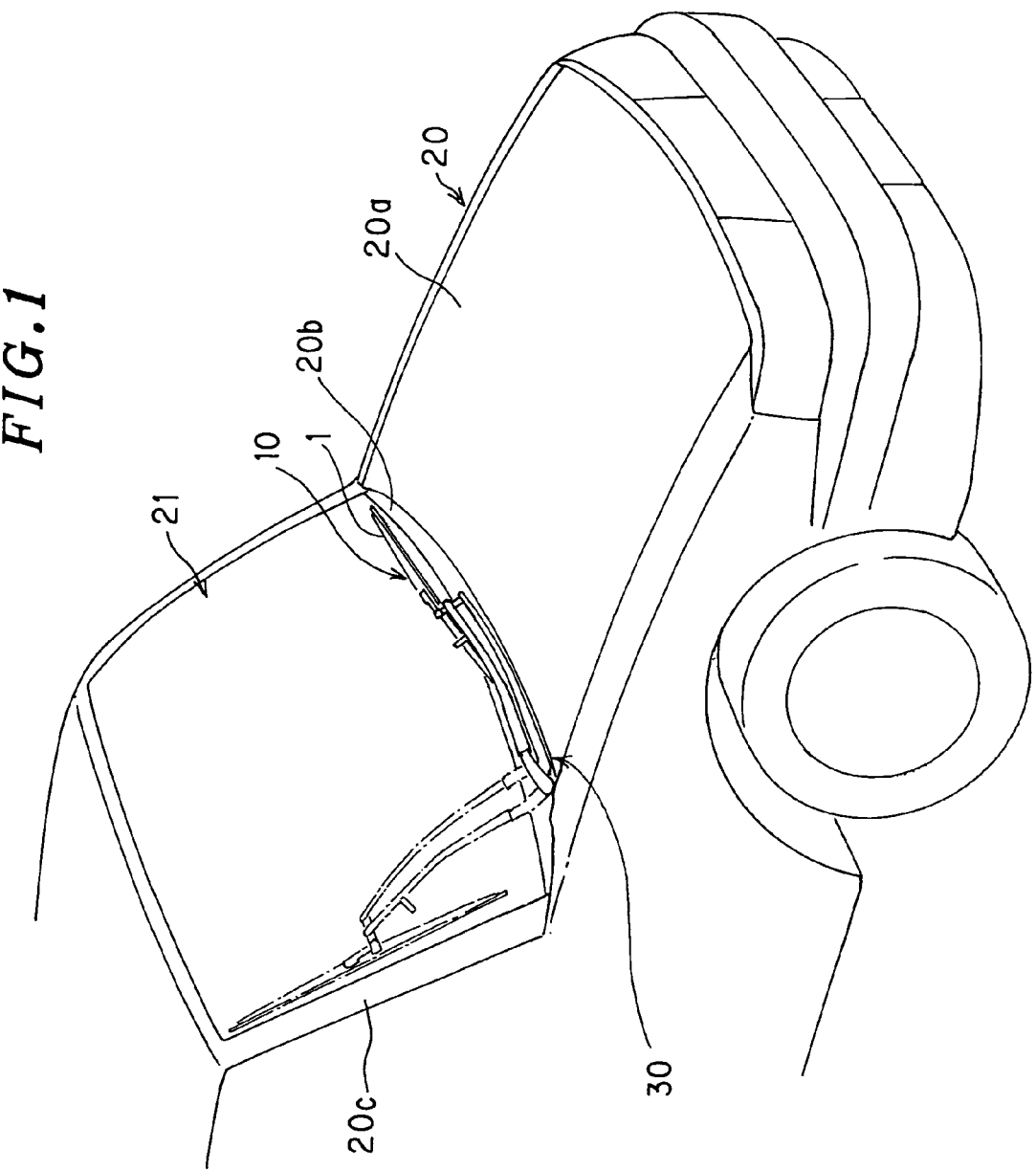
FIG. 1 is a perspective view of a vehicle having a wiper apparatus according to an embodiment of the present invention.
Figure 2:
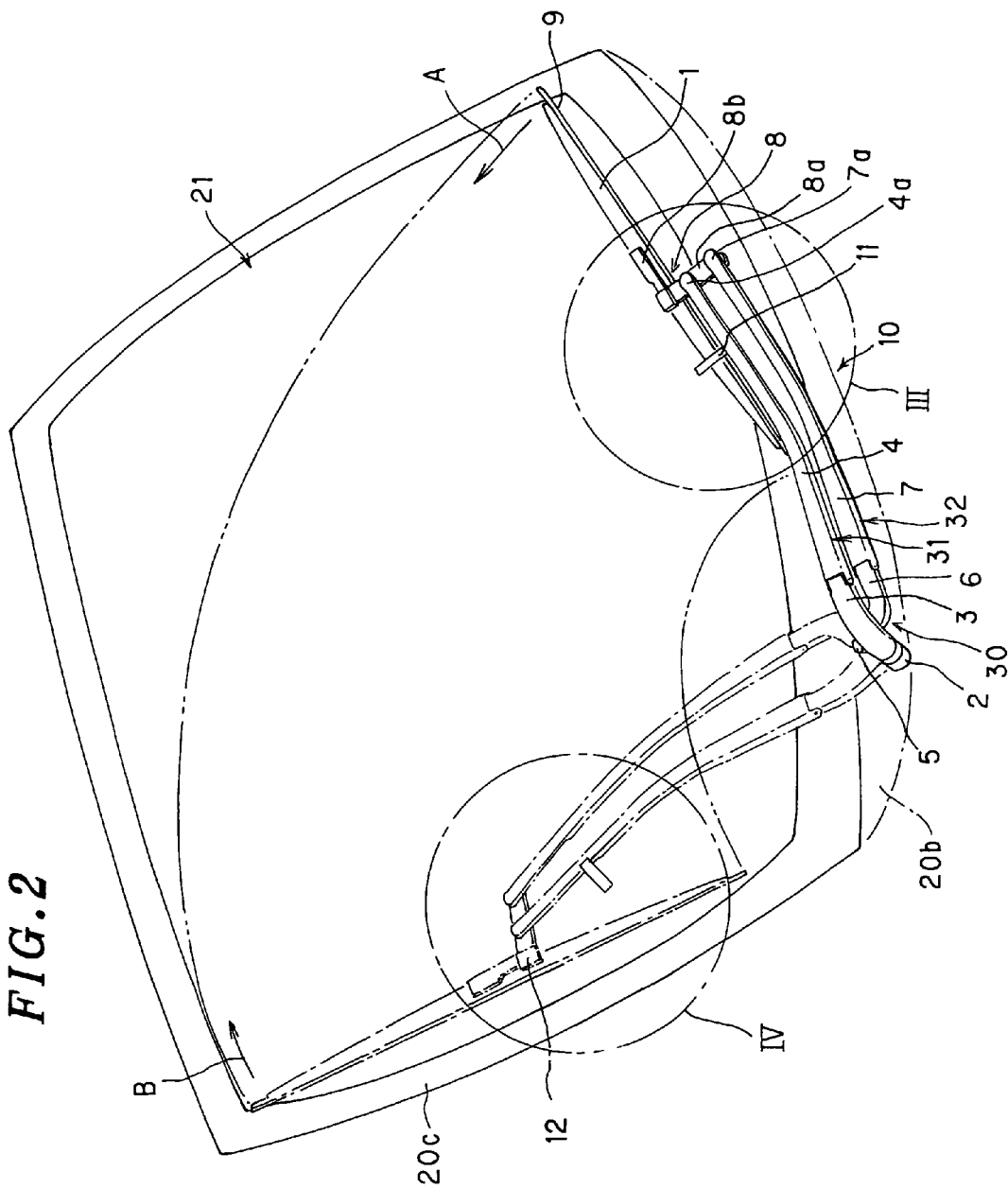
FIG. 2 is an explanation drawing of the wiper apparatus according to the embodiment of the present invention.
Figure 3:
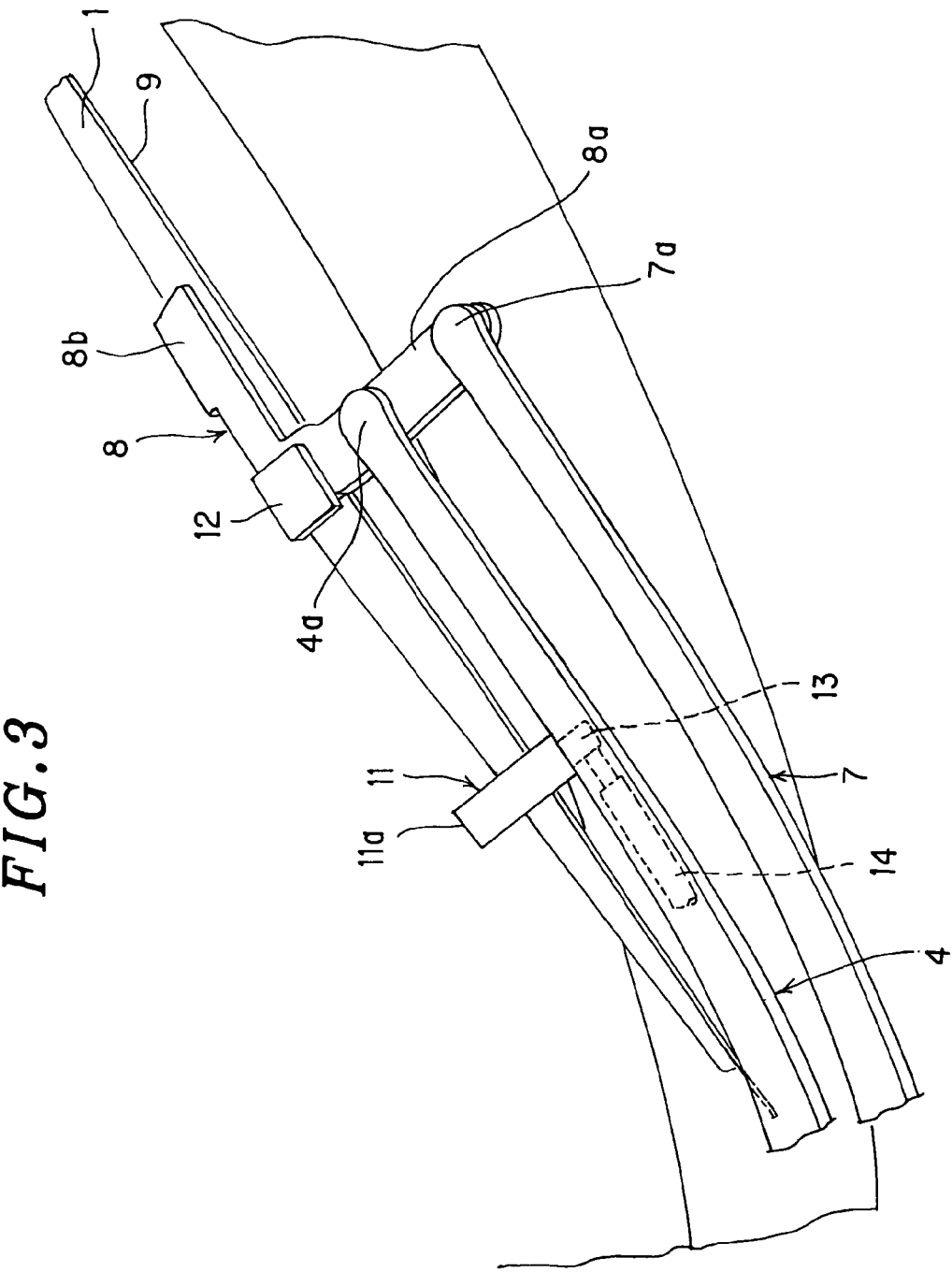
FIG. 3 is an enlarged view of a portion encircled by a line III in FIG. 2.

FIG. 1 is a perspective view of a vehicle having a wiper apparatus according to an embodiment of the present invention. FIG. 2 is an explanation drawing of the wiper apparatus according to the embodiment of the present invention. FIG. 3 is an enlarged view of a portion encircled by a line III in FIG. 2. FIG. 4 is an enlarged view of a portion encircled by a line IV in FIG. 2.

A vehicle wiper apparatus 10 according to the embodiment of the present invention is mounted in the vicinity of a windshield glass 21 of a vehicle 20, as shown in FIG. 1. The vehicle wiper apparatus 10 has a wiper blade 1, and a drive means 30 for reciprocating the wiper blade 1 in an arcuate wiping area defined on the windshield glass 21. The drive means 30, as shown in FIG. 2, has a driving pivot 2 pivotally disposed on a cowl 20b of the vehicle, a drive wiper arm 31 having a base end mounted on the driving pivot 2, an auxiliary wiper arm 32 having a base end mounted on an auxiliary pivot 5 disposed in the vicinity of the driving pivot 2, and an L-stay 8 having other end 8b attached (fixed) to the wiper blade 1 and having a base end 8*a* for rotatably supporting and connecting the other end of the drive wiper arm 31 and the other end of the auxiliary wiper arm 32.

However, the drive wiper arm 31 and the auxiliary wiper arm 32 are disposed on the same side with respect to the wiper blade 1 (on a side along one of the side surfaces of the wiper blade 1). Thus, when the wiper blade 1 is reciprocated in the arcuate wiping area, the area where a driver's field of vision is obstructed by the drive wiper arm 31 and the auxiliary wiper arm 32 can be narrowed, and the field of vision from inside the vehicle compartment can be improved.

The drive wiper arm 31 and the auxiliary wiper arm 32 are formed in a bent shape and, when the wiper blade 1 is located at its stop position, the drive wiper arm 31 and the auxiliary wiper arm 32 become invisible from inside the vehicle compartment, leading to an expanded field of vision from inside the vehicle compartment.

The drive wiper arm 31 has a driving arm head 3 having a base end fixed to the other end of the driving pivot 2, and a driving retainer 4 supported at the other end of the driving arm head 3 to be capable of rising and lowering. The other end 4*a* of the driving retainer 4 is supported rotatably at the base end 8*a* of the stay 8. The auxiliary wiper arm 32 has an auxiliary arm head 6 having a base end fixed to the other end of the auxiliary pivot 5, and an auxiliary retainer 7 supported at the other end of the auxiliary arm head 6 to be capable of rising and lowering. The other end 7*a* of the auxiliary retainer 7 is supported rotatably at the base end 8*a* of the stay 8.

The drive wiper arm 31 and the auxiliary wiper arm 32 are disposed such that the other end of the drive wiper arm 31 is located above the other end of the auxiliary wiper arm 32, when the wiper blade is located at its stop position. In this state, the up-and-down positional relationship between the other end of the drive wiper arm 31 and the other end of the auxiliary wiper arm 32 is opposite to the up-and-down positional relationship between the driving pivot 2 and the auxiliary pivot 5 (the driving pivot 2 is located below the auxiliary pivot 5).

The drive means 30 configured as above reciprocates the wiper blade 1 within the arcuate wiping area. That is, the wiper blade 1 sweeps upward in the direction of A from the vicinity of the cowl 20*b* (engine hood 20*a* of the vehicle) which is the stop position of the wiper blade 1. Then, the wiper blade 1 inverts (i.e., changes its moving direction) at the vicinity of a front pillar 20*c* (i.e., the position of inversion), and sweeps downward in the direction of B. As a result, deposits adhering to the windshield glass 21 are wiped off with the blade rubber 9 attached to the wiper blade 1.

In the neighborhood of the other end of the driving retainer 4, a first spray nozzle 11 is mounted which is a first washer fluid spray means for spraying a washer fluid. As shown in FIG. 3, a joint 13 connected at one end to the first spray nozzle 11 has the other end connected to a tube 14, and the tube 14 is connected to a washer fluid tank (not shown) for storing the washer fluid.

The first spray nozzle 11 is disposed in the following manner: When the wiper blade 1 is located in the vicinity of the stop position, the other end 11*a* of the first spray nozzle 11 is located above the wiper blade 1 (i.e., on the opposite side of the wiper blade 1 from the drive wiper arm 31), as shown in FIG. 3. When the wiper blade 1 is moved upward, while sweeping, in the direction A from the vicinity of the stop position, the wiper blade 1 and the other end 11*a* of the first spray nozzle 11 approach each other in accordance with this motion. In the vicinity of the position of inversion of the wiper blade 1, when the wiper blade 1 sweeps upward in the direction A, the first spray nozzle 11 is located rearwardly in the moving direction of the wiper blade 1 (when the wiper blade 1 sweeps downward in the direction B, the first spray nozzle 11 is located forwardly in the moving direction of the wiper blade 1), as shown in FIG. 4. When the wiper blade 1 moves downward, while sweeping, in the direction B from the vicinity of the position of inversion, the wiper blade 1 and the other end 11*a* of the first spray nozzle 11 approach each other in accordance with this motion. In the vicinity of the stop position of the wiper blade 1, the other end 11*a* of the first spray nozzle 11 is located again above the wiper blade 1, as shown in FIG. 2.

That is, when the wiper blade 1 moves in an arcuate form from the stop position to the inversion position, the first spray nozzle 11 passes over the wiper blade 1 from ahead of the wiper blade 1 to behind the wiper blade 1. When the wiper blade 1 moves in an arcuate form from the inversion position to the stop position, the first spray nozzle 11 passes over the wiper blade 1 from behind the wiper blade 1 to ahead of the wiper blade 1. As a result, when the washer fluid is sprayed, with the wiper blade 1 being located in the vicinity of the stop position, namely, the cowl 20*b*, the washer fluid arrives at the area in the upward wiping direction of the wiper blade 1. When the washer fluid is sprayed, with the wiper blade 1 being located in the vicinity of the inversion position of the wiper blade 1, the washer fluid arrives at the area in the downward wiping direction of the wiper blade 1. Thus, the washer fluid reaches the optimal area.

The first spray nozzle 11 may be one which enables the washer fluid to reach the above-mentioned area. For example, it may be a jet type spray nozzle for spraying the washer fluid linearly, or a mist type spray nozzle for spraying the washer fluid mistily.

A second spray nozzle 12, which is a second washer fluid spray means for spraying the washer fluid, is attached to the junction between the other end 8*b* and the base end 8*a* of the L-stay 8, as shown in FIGS. 3 and 4. The L-stay 8 passes on the windshield glass 21 at a position nearly in front of the vehicle driver. Since the second spray nozzle 12 is provided at the above-mentioned position, therefore, the washer fluid is sprayed from the second spray nozzle 12 during the high speed driving of the vehicle 20, whereby the washer fluid is allowed to reach and wipe the wide-range field of vision on the windshield glass 21. Thus, a satisfactory field of vision can be easily ensured in every situation of the vehicle 20.

According to the vehicle wiper apparatus 10 of the present embodiment, therefore, when the washer fluid is sprayed from the first spray nozzle 11, the washer fluid reaches the optimal area where the wiper blade 1 is to wipe, regardless of the position of the wiper blade 1. As a result, deposits on the windshield glass can be wiped off with good efficiency to easily ensure a satisfactory field of vision forward of the vehicle. Since the structure of the vehicle wiper apparatus 10 itself is simple, moreover, its addition to the manufacturing cost can be curtailed. Besides, the area where the washer fluid reaches can be appropriately set, so that the deposits on the windshield glass 21 can be easily wiped off with a small amount of the washer fluid.

The invention thus described, it will be obvious that the same may be varied in many ways.

For example, in the vehicle wiper apparatus 10, the first spray nozzle 11 is provided on the drive wiper arm 31. However, the first spray nozzle 11 may be provided such that when the wiper blade 1 is located in the vicinity of the cowl 20*b*, the first spray nozzle 11 is located above the wiper blade 1, and that when the wiper blade 1 is located near the inversion position, the first spray nozzle 11 is located forwardly in the direction of inversion. Even the vehicle wiper apparatus having the first spray nozzle 11 provided on the auxiliary wiper arm 32 exhibits the same actions and effects as those of the vehicle wiper apparatus 10.

Furthermore, the vehicle wiper apparatus 10 wipes in an arcuate manner from the vicinity of the cowl 20b to the vicinity of the front pillar 20c on the driver's seat side. However, any vehicle wiper apparatus which can wipe the windshield glass 21 may be used. For example, a vehicle wiper apparatus, which wipes the windshield glass from the vicinity of the cowl on the assistant driver's seat side to the vicinity of the cowl on the driver's seat side, shows the same actions and effects as those of the vehicle wiper apparatus 10.

Such variations are not to be regarded as a departure from the spirit and scope of the invention, and all such modifications as would be obvious to one skilled in the art are intended to be included within the scope of the following claims.

The invention claimed is:

1. A vehicle wiper apparatus arranged to wipe a windshield glass with a wiper blade, and including drive means for reciprocating the wiper blade in an arcuate wiping region on the windshield glass, and a first washer solution spray nozzle, provided on the drive means, for spraying a washer solution, wherein
   the drive means is composed of a drive wiper arm having a base end mounted on a driving pivot, an auxiliary wiper arm having a base end mounted on an auxiliary pivot disposed in a vicinity of the driving pivot, and a stay pivotally supported by a front end of the drive wiper arm and a front end of the auxiliary wiper arm and supporting the wiper blade,
   the first washer solution spray nozzle is provided on the drive wiper arm or the auxiliary wiper arm, and
   the first washer solution spray nozzle consists of a single spray nozzle located above the wiper blade to spray the washer solution to pass over the wiper blade onto a region in an upward wiping direction of the wiper blade when the wiper blade is located in a vicinity of a stop position, and said single spray nozzle located forward of the moving direction of the wiper blade to spray the washer solution onto a region in front of a downward wiping direction of the wiper blade when the wiper blade is located in a vicinity of an inversion position so that the single spray nozzle sprays washer solution in front of the wiper blade during movement in both the upward and downward wiping directions,
   wherein the first washer solution spray nozzle is provided to spray the washer solution on a side of the wiper blade opposite to a side of the drive wiper arm or the auxiliary wiper arm supporting the first washer solution spray nozzle, when the wiper blade is located in the vicinity of the stop position.

2. The vehicle wiper apparatus according to claim 1, wherein the drive wiper arm and the auxiliary wiper arm are disposed on a side along one of side surfaces of the wiper blade.

3. The vehicle wiper apparatus according to claim 2, wherein the first washer solution spray nozzle is provided on either the drive wiper arm or the auxiliary wiper arm, whichever is closer to the wiper blade.

4. The vehicle wiper apparatus according to claim 1, wherein the drive means is configured such that when the wiper blade is at the stop position, an up-and-down positional relationship between an other end of the drive wiper arm and an other end of the auxiliary wiper arm is opposite to an up-and-down positional relationship between the driving pivot and the auxiliary pivot.

5. The vehicle wiper apparatus according to claim 1, wherein a second washer solution spray nozzle is provided on the stay.

6. The vehicle wiper apparatus according to claim 1, wherein at least one of the drive wiper arm and the auxiliary wiper arm is formed in a bent shape.

* * * * *